Patented June 23, 1953

2,643,235

UNITED STATES PATENT OFFICE 2,643,235

ADHESIVE COMPOSITION CONTAINING BUTADIENE - STYRENE COPOLYMER AND A TACK-PRODUCING RESIN

Stewart L. Brams, West Alexandria, Ohio, assignor to General Motors Corporation, Detroit, Mich., a corporation of Delaware No Drawing. Application April 26, 1950,
Serial No. 158,329

2 Claims. (Cl. 260—27)

This invention relates to adhesives and is particularly concerned with rubberlike adhesive cements.

It is an object of the invention to provide a tacky rubberlike cement, while maintaining the physical properties thereof.

Another object of the invention is to provide an adhesive cement wherein the rubberlike material used therein is in a cured or partially cured condition.

In carrying out the above object, it is a still further object of the invention to provide a method for compounding a rubberlike cement wherein a cure or partial cure of the rubbery ingredient in the cement is obtained during the compounding period.

Further objects and advantages of the present invention will be apparent from the following description.

In general, rubbery cements require the use of tacky softeners, such as rosin to provide an adhesive mass. Cements of this character when sufficiently tacky to provide good adhesion often have lower physical properties than desired, such as: resiliency, heat resistance and strength. This is especially true in connection with cements made from synthetic rubbers, for example, butadiene-styrene copolymer. Instead of rosin other softeners have been used, but the same factors are present, namely, when the cement is sufficiently tacky for good adhesion the physical properties thereof are lower than desired. I have compounded a new type of rubberlike cement and provided a method for making said cement wherein the physical properties are raised over previous cements using similar quantities of rubberlike material and resin while the tack of the cement is satisfactory. This cement is formulated from butadiene-styrene copolymer. The formula for the cement may vary widely for the specific use, a representative formula is as follows:

Coagulated butadiene-styrene copolymer latex, 100 parts
Curing agent:
    Vulcanizing agent___½ part to 10 parts ⎫ 1 to 20
    Accelerator_____½ part to 10 parts ⎭ parts
Tack-producing compound_____75 parts to 250 parts
Solvent as required.

In this compound the rubbery stock is preferably milled to plasticize it to some extent and is then placed in a heated internal mixer wherein the jacket of the mixer, for example, a Werner-Pfleiderer type, is maintained by steam at a suitable temperature, for example, 275° to 325° F. The mixer is started and tack-producing compounds are added to the plasticized rubbery stock. In most cases, these compounds are tacky resins such as wood rosin, coumarone indene resin, hardened wood rosin or the like. In some instances, other tack-producing compounds, such as softening oils, may be utilized. The accelerator is added and when the mixture is smooth, the vulcanizing agent (sulphur) is added and the mixture is allowed to knead for about 30 minutes to one hour and a half according to the temperature and the specific accelerators used. Cooling water is then circulated through the walls of the mixer and when the mixture is sufficiently cooled, solvent is added to produce a paste, or thin cement, the viscosity of which is controlled in accordance with the contemplated use thereof. The essential factor to the success of my invention is this hot kneading or mixing of the ingredients wherein the sulphur or other vulcanizing agent cures, or partiallly cures, the copolymer to make an adhesive of good tacky properties with high flexibility and strength.

It is to be understood that the aforementioned quantities, temperature and times are preferred ranges and that these factors may vary to conform to a specific formula desired as will be known to persons skilled in the art.

One specific compound that has been made with very good results is a synthetic rubber cement made from butadiene-styrene copolymer rubber wherein the preferred formulation is as follows:

```
                                              Parts by weight
Plasticized butadiene-styrene copolymer rubber (co-
    agulated latex)_____ 400
Sulphur _____   8
Antioxidant _____   8
Mercaptobenzothiazole _____   8
Zinc oxide _____ 100
Hard processing carbon black_____  65
Resin:
    Hard coumarone indene resin (200) ⎫
    Wood rosin (200)                  ⎬_____ 600
    Hardened wood rosin (200)         ⎭
Solvent to dissolve _____1450
```

Another representative formula is:

```
                                                     Parts
Butadiene-styrene copolymer_____ 100
Resin:
    Coumarone indene resin (50)   ⎫
    Hardened wood rosin (100)     ⎬_____ 150
Softeners:
    Pine tar (7.5)                ⎫
    Coal tar softener (7.5)       ⎬_____  33
    Dibutylphthalate (18)         ⎭
Pigments:
    Zinc oxide (6)                ⎫
    Ferric oxide (25)             ⎬_____  43
    Hard processing carbon black (12) ⎭
Antioxidant phenylbeta naphthylamine_____   3
Accelerator:
    Mercaptobenzothiazole _____   3
Sulphur _____   3
Solvent as required.
```

In the formulas noted hereinbefore, a number of solvents may be used satisfactorily, for example, normal hexane, heptane, normal octane, straight-run gasoline, isoheptane, toluene, xylene, cyclo-hexane, chloro-benzene and many others are satisfactory. Similarly, a number of accelerators other than mercaptobenzothiazole are satisfactory, such as, the thiurams which include the mono and tetra sulphides thereof, thiazoline types which include modified thiazoles 2-mercaptothiazoline, etc.. Similarly, anti-oxidants other than phenylbetanaphthylamine are well known in the art. In fact, du Pont report 42-4 of December 1942 discusses a number of materials which may be used in the compounding of butadiene-styrene copolymer materials. Similarly, du Pont booklet "Preparation of Buna S Cements" (B1-59) published November 1942 gives many solvents, etc., which may be used in cements of this general character. Therefore, it is to be understood that the exact formulation with respect to exact ingredients used is of no great importance if equivalent materials are utilized wherein the final cement has the desired properties. It is apparent that the most important feature of this cement includes the butadiene-styrene copolymer base together with materials to vulcanize the same which includes both sulphur and the accelerator and a tack-producing compound together with a solvent to bring the whole mixture to a desired constituency. In all cases, the compound is at least partially cured during its formulation and this is most important to the success of this cement since if the rubbery constituency is not partially cured, the cement lacks the strength which is necessary in its ultimate use.

It should be understood that the compound may be used for purposes other than the cement, for example, it may be used as an adhesive in connection with adhesive tape, etc., where a tacky material is desired. The partially cured butadiene-styrene copolymer provides good adhesion between metal, glass and other substantially non-porous surfaces which heretofore have been difficult to bond together and may be prepared in any desired constituency by use of proper quantities of solvent.

With the embodiments of the present invention as herein disclosed, constitute preferred forms, it is to be understood that other forms might be adopted.

The present case is a continuation-in-part of Serial No. 555,037, filed on September 20, 1944 and now abandoned.

What is claimed is as follows:

1. An adhesive composition, consisting of a suitably fluid, highly tacky mixture of butadiene-styrene copolymer 100 parts, sulphur and accelerator in substantially equal proportions 1 to 20 parts, a tack-producing resin taken from the class consisting of wood rosin, hardened wood rosin and coumarone indene resin and mixtures thereof 150 to 250 parts, together with pigments and softeners, all of said ingredients being mixed at temperatures ranging from 275° F. to 325° F. for a time sufficient to effect a cure of the rubbery compound in situ during the mixing operation and sufficient solvent to bring the cured mixture to the desired fluidity.

2. An adhesive composition, consisting of a compound of highly tacky adhesive qualities which comprises the following starting ingredients: butadiene-styrene copolymer 400 parts, mercaptobenzothiazole 8 parts, sulphur 8 parts, a tack-producing resin taken from the class consisting of wood rosin, hardened wood rosin, coumarone indene resin and mixtures thereof 600 parts, together with pigments and softeners, all of said compound being mixed at temperatures of from 275° F. to 325° F. for a time sufficient to at least effect a partial cure of the butadiene-styrene copolymer in situ, and a suitable solvent for the compounded mixture in quantities sufficient to produce the desired fluidity of the compound.

STEWART L. BRAMS.

References Cited in the file of this patent

UNITED STATES PATENTS

| Number | Name | Date |
|---|---|---|
| 2,459,891 | Nelson et al. | Jan. 25, 1949 |
| 2,461,954 | Barrgmeyer | Feb. 15, 1949 |